UNITED STATES PATENT OFFICE.

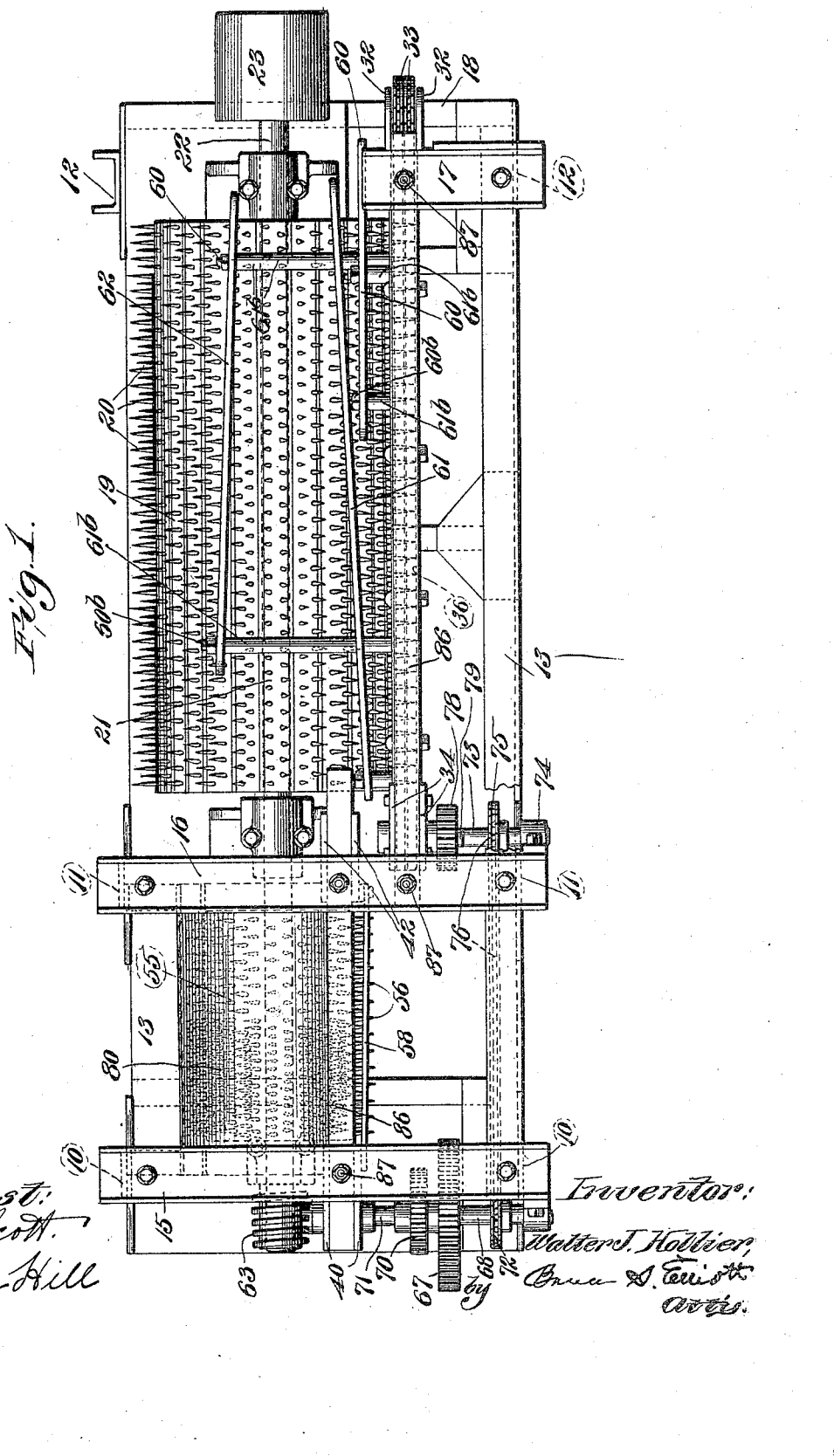

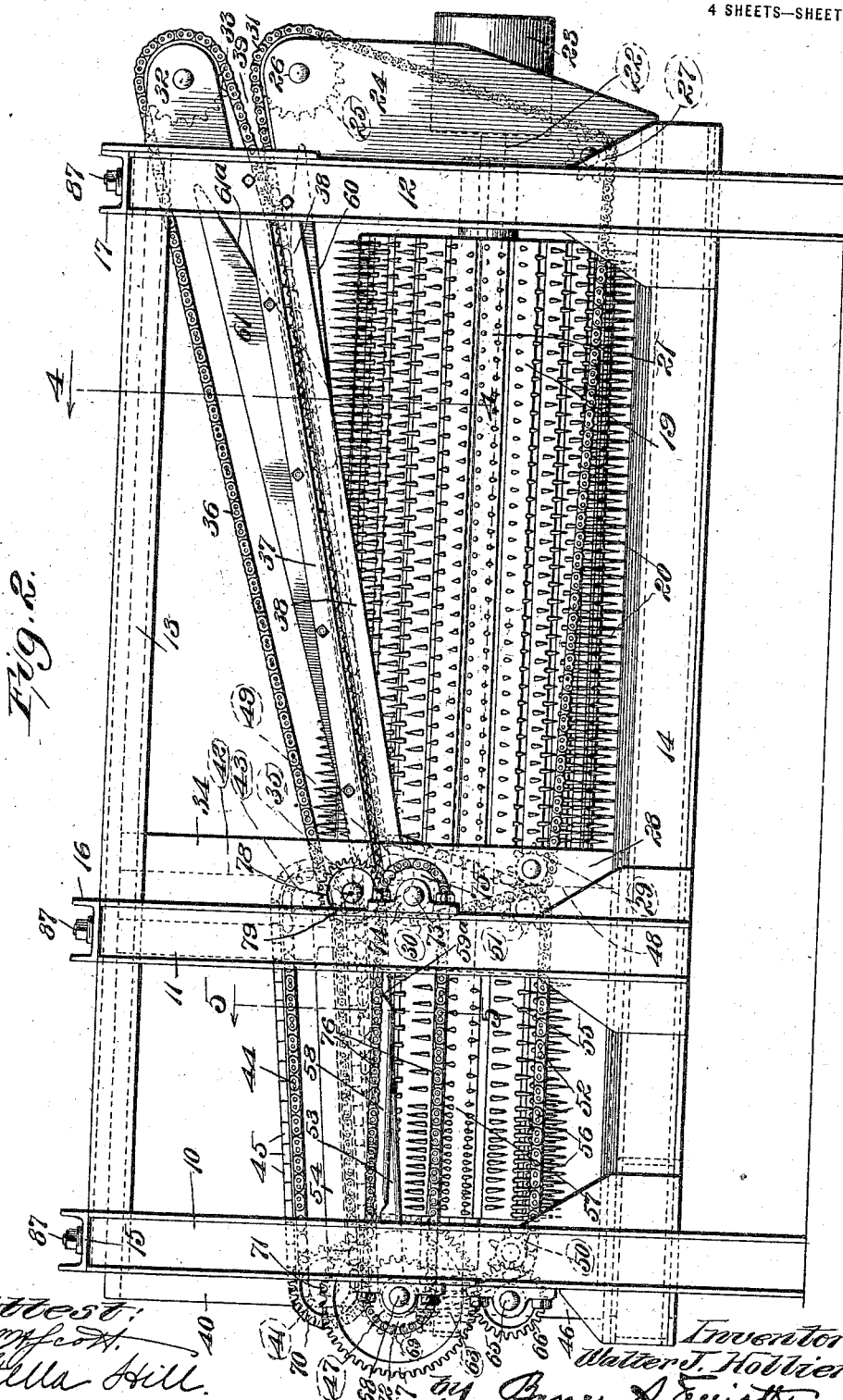

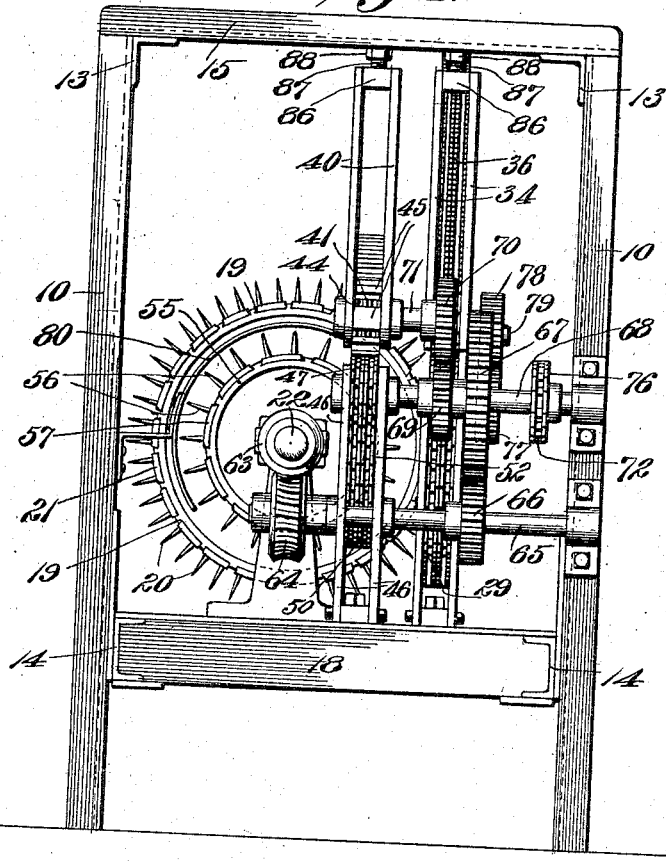

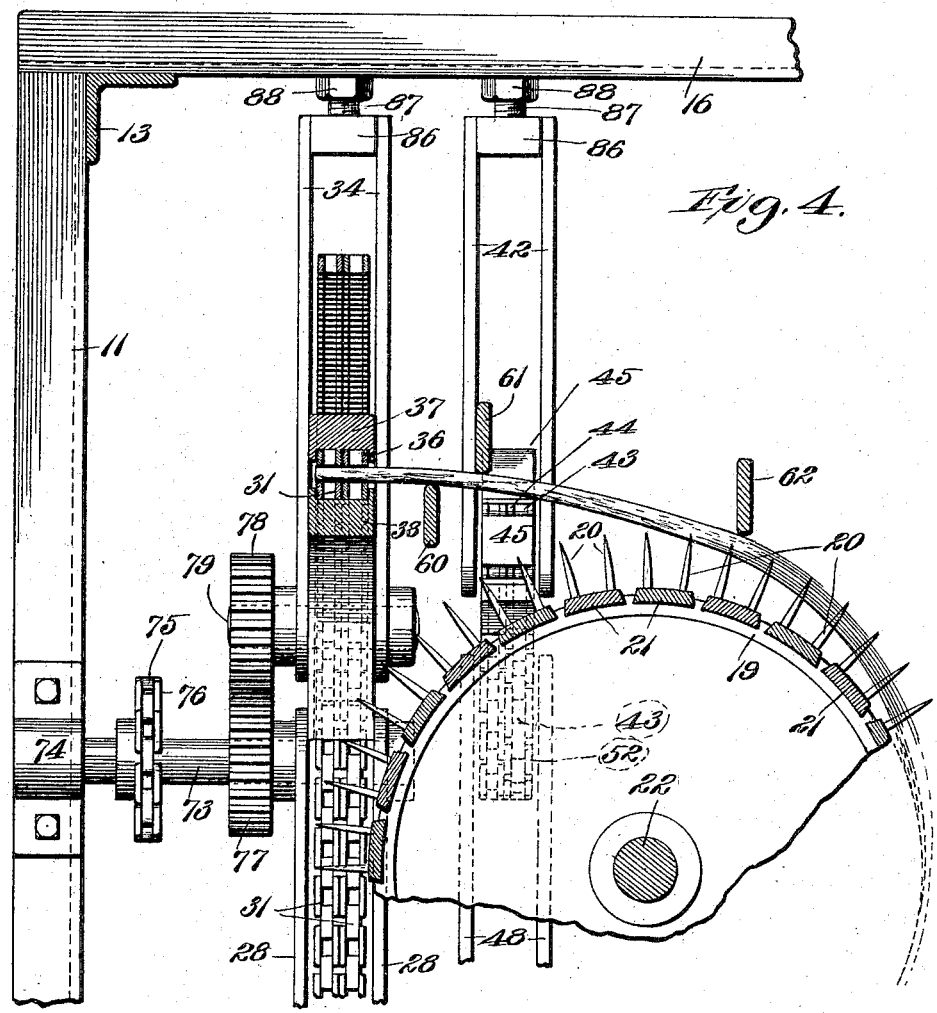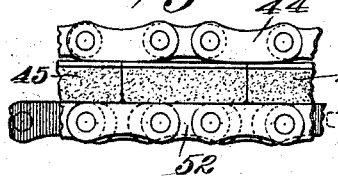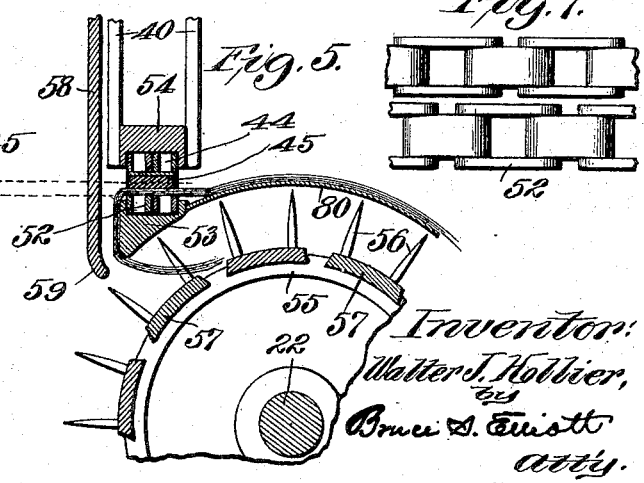

WALTER JOHN HOLLIER, OF ST. LOUIS, MISSOURI.

MACHINE FOR DECORTICATING FIBROUS PLANTS.

1,186,784.  Specification of Letters Patent.  Patented June 13, 1916.

Application filed August 5, 1912. Serial No. 713,220.

*To all whom it may concern:*

Be it known that I, WALTER JOHN HOLLIER, a British subject, residing in the city of St. Louis and State of Missouri, have invented new and useful Improvements in Machines for Decorticating Fibrous Plants, of which the following is a specification.

This invention relates to a novel machine for separating the fiber from fibrous plants of either the leaf or stalk variety. It is particularly adapted for recovering fiber from plants of the aloe and agave families, from New Zealand and Manila hemp, and from sansivera, penguin and the banana stalk.

In the embodiment of the invention, as illustrated in the accompanying drawings, which were made from a full size, commercial machine, I aim to provide more particularly for the treatment of the leaf plants as indicated above; but the principle of the invention may be equally well applied to the treatment of all characters of fibrous plants, including, among others of the stalk variety, ramie, hemp and jute and more particularly flax, necessitating only such changes in form or proportion as may be required by the nature or size of the material to be treated.

Generally speaking, the machine comprises two revolving cylinders of different sizes mounted on the same shaft to rotate in unison, said cylinders being provided with ribs of projecting pins around their entire circumference, and means for feeding the material lengthwise of these cylinders and into contact with the pins thereof in such manner that the outer cuticle and waste matter is removed from the fiber from first one portion of the leaf or stalk and then from the other.

A highly important feature of the invention is the fact that the plants are so fed that they are progressively acted upon by the cleaning parts of the larger cylinder from the outer toward the rear or butt end of the leaves or stalks, which operation obviates all strain on the fiber and eliminates practically all loss of same. The smaller cylinder is employed for decorticating the portion of the plant previously gripped by and closely adjacent to the feed carrier of the larger cylinder, and which, therefore, cannot be cleaned by the main or larger cylinder.

Among the many desirable characteristics of the machine is the fact that the cylinders (*i. e.* the entire cleaning mechanism) are mounted on one shaft, making a compact, durable, light and very strong machine, with a maximum capacity, and minimum of power required for its operation,—a desideratum long sought.

An adjunct of the invention comprises the use of cutting members for severing the butt end of the plant from the decorticated product, where, as is frequently the case, it is of such a character, as not to possess a commercial value, or as not being susceptible of the decorticating operation.

In the accompanying drawings—Figure 1 is a plan view of a machine embodying my invention; Fig. 2 is a view in side elevation of the same; Fig. 3 is a view in end elevation; Fig. 4 is a broken sectional view on an enlarged scale, taken on the line 4—4 of Fig. 2; Fig. 5 is a similar view on the same scale as Fig. 4, taken on the line 5—5 of Fig. 2; Fig. 6 is a view on a further enlarged scale showing, in side elevation, a portion of the members constituting the secondary carrier, or that for transporting the plant past the second cylinder; Fig. 7 is a plan view on the same scale as Fig. 6 of the portion of the double chain constituting the lower member of the secondary carrier; Fig. 8 is a detached sectional view, on an enlarged scale, illustrating the application of cutters for severing the butt end of the plant from the part that has been decorticated; and Fig. 9 is a view in broken sectional elevation showing the terminal portion of the main carrier chains, and a portion of the cutters shown in Fig. 8.

Referring now to these drawings, it will be seen that the machine is rectangular in shape, comprising, generally, uprights 10, 11 and 12, upper and lower longitudinal frame members 13, 14, upper cross beams 15, 16 and 17, and lower cross beams 18. These parts of the frame are identified merely for the purpose of assisting in locating the parts of the machine to be hereinafter referred to, as, of course, the construction of the frame forms no part of the invention. The numeral 19 indicates the main cylinder which, in practice, is about a foot in diameter and three feet in length, and is provided around its circumference with pins 20, which are approximately one and a quarter inches in length and preferably arranged in longitudinal rows extending from end to end of the cylinder, the pins of one row having a staggered relation to the pins of the two adjacent rows. In practice, and as shown more clearly in Fig. 4, two rows of pins 20 are secured in a bar 21, which, in turn, is secured in a dove-tail groove extending longitudinally of the cylinder 19 from end to end thereof in such manner as to project about an eighth of an inch beyond the surface of the cylinder, a number of said bars thus provided with pins extending around the entire circumference of the cylinder. The cylinder 19 is mounted on a shaft 22 which, in turn, is mounted in suitable bearings provided in the frame of the machine, the said shaft 22 having secured on one end, at what I will term the front end of the machine, a pulley 23 which may be driven by a belt (not shown) and from which the machine, as a whole, is operated. Mounted between and at the upper end of a pair of plates 24, secured on the front end of the frame, is a double sprocket wheel 25, the bearing of said wheel being indicated at 26 in Fig. 2. Toward the lower end of these plates 24 there is mounted a second double sprocket wheel 27. Toward the rear end of the cylinder 19 a pair of plates 28 are secured to the frame, and between these plates is mounted a third double sprocket wheel 29, and above it a fourth double sprocket wheel 30. The sprocket wheels 25, 27, 29 and 30 are shown only in dotted lines in Fig. 2. The sprocket wheel 30, however, and a companion sprocket wheel to be later referred to, are shown in full lines in Fig. 8. Over the sprocket wheels thus located pass two sprocket chains 31 which travel together as one chain. Above the plates 24 there is secured to the upper part of the frame, at the front end of the machine, two arms 32 between which is mounted a double sprocket wheel 33. Mounted between plates 34, similar to, and extending in line with, the plates 28, above the same, is a double sprocket wheel 35 (see Fig. 8), and over the sprocket wheels 33 and 35 pass two sprocket chains 36, which travel together as one chain. The chains 31 and 36 travel in parallel relation for a portion of their distance in an inclined direction, as shown more clearly in Fig. 2, and extending between the uprights 16 and 17 is a channeled race-way 37, and immediately below it, and parallel thereto, a similar race-way 38, the chain 36 traveling in the race-way 37, and the chain 31 in the race-way 38, and said race-ways causing the chains to travel in parallel relation and in such close proximity that they will firmly grip material inserted between them. As shown at the right of Fig. 2, these chains slightly diverge at the front end of the machine to provide a feeding space 39 for the insertion of the butt end of the plant which will be gripped by the chains as they pass into the race-ways and carried forward to be acted on by the pins of the cylinder 19. Supported in the main frame at the rear end of the machine are two vertically disposed parallel plates 40 (Fig. 3), between which and in suitable bearings is mounted a double sprocket wheel 41, shown in Fig. 3 and in dotted lines in Fig. 2, and between similar plates 42, (Fig. 4) there is mounted a similar double sprocket wheel 43, and over the sprocket wheels 41 and 43 is passed a double sprocket chain 44, on the outer side of the links of which are mounted a series of rubber or other elastic blocks 45. Below and in line with the plates 40 are mounted a similar pair of plates 46, between and toward the upper end of which is mounted a double sprocket wheel 47. Beneath the sprocket wheel 43 there is mounted in the upper end of a pair of plates 48, located below and in line with the plates 42, a double sprocket wheel 49. Suitably mounted in bearings below the two sprocket wheels last described are two idler sprockets 50 and 51, and around the sprockets 47, 29, 50 and 51 are passed two sprocket chains 52. The sprocket chains 52 move for a portion of their length in a plane parallel to a plane traversed by the blocks 45 in a portion of their movement, the chains 52 in such portion of their movement running in and being supported by a race-way 53 (Fig. 5) and the chain 44 carrying the blocks 45 running in a race-way 54 mounted in the frame in parallel relation with the race-way 53. As shown by Figs. 5 and 6, the race-ways 53 and 54 are positioned such a distance apart that the blocks 45 will run in direct contact with the outer surface of the links of the chain 52, so that these blocks being of a yielding nature will firmly grip the fiber passing between them and the surface of the chain 52, but will have no tendency to crush the fiber. In this connection it may be stated that Figs. 6 and 7 represent the said chains and blocks in full size.

As already stated, a smaller decorticating cylinder is mounted on the shaft 22 with the large cylinder 19. This cylinder is indicated by the numeral 55, and is provided with pins 56 secured in bars 57 running longitudinally of the cylinder in the same manner as described with reference to the cylinder 19, and performing the same function in the cleaning operation, as later referred to. In respect to the cylinder 55, however, the pins in the rear half of the cylinder are arranged very much closer together than in the forward half, as clearly shown in Figs. 1 and 2. At the back of the pin cylinder 55, and extending parallel with the surface thereof, there is arranged a plate 58 (Figs. 2 and 5), the lower edge of which curves slightly toward the cylinder, as indicated at 59, and extends at its forward end a short distance below the lower edge of the race-way 53. From this lowermost point, the plate 58 is cut away to provide an inclined portion 59ª on its under side at its forward end, as shown in Fig. 2. The purpose of this plate will appear from the description of the operation of the machine to be given later.

Located in front of the race-way 38, and extending approximately one-third of the distance from the front of the machine toward the rear end of the pin cylinder 19, is a bar 60 (Figs. 1 and 4) for supporting the inner portion of the plant being decorticated, and thus holds such portion of the plant above and out of contact with the pins of the cylinder in the early part of the decorticating operation. Located in front of the bar 60, and extending on a backward and downward incline, is a second bar 61, provided on its under side at its forward end with an inclined portion 61ª, the under edge of which bar engages the plant and causes its outer end to be pressed downward toward the cylinder 19. As shown by Fig. 1, the rear end of this bar approaches close to the race-way 38, and serves the purpose particularly of forcing the portion of the plant adjacent to the butt end downward against the pins of the cylinder to insure that such portion of the plant shall be acted upon by the decorticating cylinder. Located a considerable distance in front of the bar 61 is a third bar 62, which extends from the front end to a point well toward the rear end of the cylinder 19, and likewise inclines downward from the front toward the rear end of said cylinder, and has an inclined portion on its under side at its forward end (not shown). This bar extends in a direction diverging outwardly from the axial line of the cylinder, and its purpose is to depress the extreme outer end of the plant so that such end will be engaged by the chains of the cylinder. The bars 60, 61 and 62 are supported and braced in any preferred manner from various fixed parts of the machine, as by the use of bolts 60ᵇ and spacing tubes 61ᵇ surrounding said bolts.

It has already been stated that the machine as a whole is driven from the pulley 23, mounted on the forward end of the shaft 22. The remaining elements of the driving mechanism will now be described. On the rear end of the shaft 22 is mounted a worm 63 which is in mesh with a worm gear 64 secured on the end of a cross-shaft 65 mounted in suitable bearings in the frame of the machine. Fixedly secured on the cross-shaft 65 is a gear 66, which is in mesh with a larger gear 67 fixedly secured on a cross-shaft 68, which likewise is mounted in suitable bearings in the frame of the machine. Also mounted on the cross-shaft 68 is a gear 69 which is in mesh with a similar gear 70 mounted on a stub shaft 71 having bearings in the lower end of the plates 40. The sprocket wheel 41 is likewise mounted on this stub shaft 71 and through the connection described the sprocket chains 44 are driven. Mounted on the shaft 68 is also a sprocket wheel 72. Mounted on a cross-shaft 73, one end of which is supported in bearings in the upper end of the plates 28 (Fig. 4) and the other end of which is supported in a bearing 74 on the standard 11, is a sprocket wheel 75, and over the sprocket wheels 72 and 75 is passed a sprocket chain 76 by means of which the shaft 73 is revolved from the shaft 68. Mounted on the shaft 73 is a gear 77, which is in mesh with a similar gear 78 mounted on a stub shaft 79 supported in bearings in the lower end of the plates 34. The double sprocket wheel 35, previously referred to, is mounted on the stub shaft 79, and by the sprocket and gear connection described the sprocket chains 36 are driven. In like manner the double sprocket wheel 30, previously referred to, is mounted on the cross-shaft 73 and through the mechanism described the chains 31 are thereby driven.

The various sprocket chains forming the carriers for the material have been described as traveling in pairs; this construction has been adopted merely for the sake of economy and convenience in construction in accomplishing the object of providing relatively broad gripping surfaces for the plants to be decorticated. I wish it understood, however, that the invention is in no wise limited to the use of double sprocket wheels and pairs of sprocket chains traveling together, but if desired single sprocket chains of sufficient width may be substituted in each instance for the two chains described.

Referring to Fig. 5, the numeral 80 indicates a guard which is in the form of a curved plate secured at its inner edge to the race-way 53, and at its ends to the frame of the machine, said guard extending part way around the pin cylinder 55, and its purpose being to support that part of the plant, which has already been decorticated by the main cylinder 19, while the butt end of the plant is being treated by the small cylinder 55. In other words, the portion of the plant decorticated by the cylinder 19 simply rides over the guard 80 as the remainder of the plant is treated by the cylinder 55.

In operation, the butt end of the plants are successively inserted in the space 39 between the chains 31 and 33 which clamp the plants and act as a carrier to convey them toward the forward end of the machine. The plant first passes upon the bar 60 which supports it for a portion of its travel, and then engages the inclined end of the bar 61, and practically at the same time passes under the inclined end of the bar 62, and as it progresses these latter two bars operate to bend the plant downward, the bar 62 forcing the extreme outer end of the plant upon the pins 20, and as the cylinder 19 is rapidly revolved the plant is progressively decorticated from its outer end inward. In this operation, the bars 21 act to knock off thorns, or other projections, on the material being cleaned, and to brush the woody particles, and the like, from the fiber, thus materially assisting in the cleaning operation. Owing to the inclination of the bars 61 and 62 the plant is pressed farther and farther downward upon the pin cylinder, and by the time the plant has reached the rear end of the bar 62 the greater portion of the plant will have been decorticated. The bar 60, however, is continued to the extreme rear end of the pin cylinder and operates to press downward that portion of the stalk adjacent to the clamping chains so that all but a very small portion of the plant will be acted upon by the pins of the cylinder 19. As clearly shown by Figs. 1 and 4, the chains 44 and 52, constituting the carrier for the secondary or finishing cylinder 55, travel in a plane considerably in front of the plane traversed by the carrier chains of the main cylinder. As the decorticated product nears the end of the first carrier it passes between the blocks 45 and the chain 52 of the second carrier, which latter will therefore clamp the product in the portion which has already been acted upon by the decorticating cylinder 19. The butt end of the plant now passes from between the chains of the first carrier, and in its onward progress it strikes the inclined and curved end of the plate 58, which causes said butt end to be bent downward into the path of the pins of the cylinder 55, which engage the same and at once bend it under the race-way 53 where it is acted upon by the said pins and by the bars 57 during its progress to the end of the machine. In this latter operation the part of the plant already decorticated by the main cylinder rests upon and travels over the guard 80. As the product leaves the second carrier it may fall upon conveyers which remove it from the machine, or it may be caught and removed by an operator.

As previously stated, it frequently occurs that the butt end of the plant being treated is unsuitable for treatment to recover fiber, or else the fiber thereof is of no commercial value. When such character of plant is being decorticated, I employ cutters for severing the butt end of the plant from the decorticated portion as it leaves the first carrier. These cutters are illustrated in Fig. 8. On the inner end of the shaft 79 I removably secure in any preferred manner a disk cutter 81. On the inner end of the shaft 73 I mount a similar disk cutter 82, which is keyed on the shaft, as indicated at 83, so as to be capable of longitudinal movement thereon, and between said cutter and a shoulder 84 on said shaft I mount a spring washer 85, or any similar resilient member, such as a rubber washer or coil spring, which will operate normally to press the cutter 82 against the cutter 81. It will be seen that as the plant is carried forward by the chains 31 and 35 it will be caused to pass between the cutters described, which operate to sever the butt end of the plant from the decorticated portion adjacent to the carrier chains.

The upper race-ways 37 and 54 are mounted at their opposite ends, respectively, in the corresponding sets of parallel plates before referred to as forming the supports for the sprocket wheels of the upper chain of each carrier, the manner of mounting these said plates being best shown in Fig. 4. These sets of plates, such as 34, 42, respectively, constitute, in effect, a frame, being connected at their upper ends by bars 86, which receive the threaded ends of bolts 87 passing through the transverse frame pieces 15, 16 and 17. Each of these bolts is provided with a lock-nut 88. By loosening these nuts and turning the bolts 87 in one direction or the other the upper race-ways may be adjusted at the proper distance from the lower race-ways so that the respective sets of carrier chains may be caused to move at the proper distance from each other to clamp the material being decorticated.

While, as heretofore stated, the invention is not limited to the use of double sprocket chains for the carriers constituting the feed mechanism, nevertheless, and especially in connection with the feed chains of the smaller cylinder, this construction I find to be highly advantageous, and I will therefore describe the same somewhat more in detail. Referring to Figs. 6 and 7, the two sprocket chains 52 are shown arranged side by side in such manner that their links break joint, that is to say, each plate of one chain lies opposite the space between two connected plates of the adjacent chain. The rubber blocks 45 are of a width to extend over the two chains, and in practice the decorticated product will be pressed by the block over the edges of the links of one or the other chain, which edges provide a secure gripping surface and prevent the fiber from being pulled out of the carrier. If the chains were arranged with the links of one chain directly opposite the links of the adjacent chain, flat, or relatively smooth surfaces would occur at regular intervals which would not provide sufficient grip or resistance to prevent the fiber from being pulled from between the chains and rubber blocks. In the case of a single chain, of the ordinary construction, this same result would follow as to the portion of the fiber resting on the plates of the chain. In the present construction it will be readily seen that the occurance of a smooth part in one chain is off-set by the like occurance of an open space between the links of the adjacent chain.

I claim:

1. In a machine for decorticating fibrous plants, a rotary cylindrical decorticating member, an endless carrier for conveying a plant sidewise over said member from one end to the other thereof in a straight, downwardly-inclined path, and stationary means adapted to be continuously engaged by said plant in its progress over the decorticating member for forcing the plant into contact with said member progressively from the outer end of the plant inward.

2. In a machine for decorticating fibrous plants, a pair of rotary decorticating members, means for conveying a plant sidewise in a straight, downwardly-inclined path over the first decorticating member from one end to the other thereof, and progressively toward and into contact therewith from the outer end of the plant inward, means for conveying the partly decorticated plant past the second decorticating member, and means for causing the butt end of the plant to be engaged thereby.

3. In a machine for decorticating fibrous plants, a pair of rotary decorticating members, feeding mechanism for engaging one end of said plant and conveying it past the first decorticating member, means for causing said plant to progressively engage said member from the outer end of the plant inward, feeding mechanism for conveying the decorticated product over but out of contact with the second decorticating member, and means for causing the butt end of the plant to be engaged by the second decorticating member in the latter operation.

4. In a machine for decorticating fibrous plants, a pair of rotary pin cylinders, means for feeding a plant past the first cylinder and progressively into contact with the pins thereof from the outer end of the plant inward, means for feeding the partly-decorticated plant past the second cylinder, a guard partly surrounding said second cylinder for supporting the decorticated portion of the plant in its passage over the cylinder, and a guide member positioned to engage the butt end of the stalk, and to force it into contact with the pins of the second cylinder.

5. In a machine for decorticating fibrous plants, a pair of rotary pin cylinders, feeding mechanism for gripping and conveying a plant bodily past the first cylinder, a series of bars supported above the first cylinder and so positioned and arranged that the plant will be supported toward its inner end by one of said bars for a portion of its movement, and will be gradually forced downward by engagement with the under side of said bars so as to progressively engage the pins of the first cylinder from the outer end of the plant inward, feeding mechanism for receiving the partly decorticated plant and conveying it past the second cylinder, and a bar positioned adjacent to the second cylinder and having an inclined forward end on its under side, whereby as the partly-decorticated plant is carried over the second cylinder its rear portion will engage the under side of said bar and be bent downward into engagement with the pins of said second cylinder.

6. In a machine for decorticating fibrous plants, a pair of pin cylinders mounted in endwise relation on a common shaft, one of said cylinders being of greater length and diameter than the other, means for conveying a plant past the larger cylinder, means for causing said plant to engage the pins of such cylinder progressively from the outer end of the plant inward, conveying mechanism for carrying the partly-decorticated plant past the smaller cylinder, and means for forcing the butt end of said plant into contact with the pins of the last-named cylinder.

7. In a machine for decorticating fibrous plants, a pair of pin cylinders mounted in endwise relation on a common shaft, one of said cylinders being of greater length and diameter than the other, and the pins of each cylinder being secured in bars extending around the entire circumference of the cylinder from end to end thereof, means for conveying a plant past the larger cylinder, means for causing said plant to engage the same progressively from the outer end of the plant inward, conveying mechanism for carrying the partly-decorticated plant past the smaller cylinder, and means for forcing the butt end of said plant into contact therewith.

8. In a machine for decorticating fibrous plants, a pair of pin cylinders mounted in endwise relation on a common shaft, a pair of sprocket chains mounted to travel in close proximity and parallel to each other and longitudinally of the first cylinder throughout the length thereof, said chains being adapted to grip the end of a plant inserted between them and carry it bodily past the first cylinder, means for forcing said plant into contact with the pins of the first cylinder progressively from the outer end of the plant inward, a pair of sprocket chains mounted to travel in parallel relation throughout the length of the second cylinder, resilient blocks secured to the links of one of said chains and having their outer surfaces traveling in contact with the links of the second chain, whereby to grip the decorticated part of the plant treated by the first cylinder and convey the plant over the second cylinder, a guard for supporting the decorticated portion of the plant in its passage over the second cylinder, and a bar positioned to be engaged by the butt end of said plant and to force the same into contact with the pins of the second cylinder as the plant is carried over the same.

9. In a machine for decorticating fibrous plants, a pair of rotary pin cylinders mounted in endwise relation on a common shaft, the second cylinder being of less length and diameter than the first cylinder, feeding mechanism extending longitudinally of the first cylinder at the back thereof, feeding mechanism extending longitudinally of the second cylinder and at the back thereof, but located in advance of the feeding mechanism of the first cylinder, whereby a plant carried over the first cylinder by the first-named feeding mechanism will have its decorticated portion fed into the feeding mechanism of the smaller cylinder and its butt end released by the first-named feed mechanism, means for forcing a plant being conveyed over the first cylinder progressively into contact with the pins thereof from the outer end of the plant inward, and means for forcing the butt end of the plant released by the first feeding mechanism into contact with the pins of the second cylinder.

10. In a machine for decorticating fibrous plants, in combination with a pair of decorticating members, a pair of traveling chains positioned to run longitudinally of each cylinder, respectively, an upper and lower raceway for receiving and guiding each set of chains, frames supporting each of said upper race-ways, sprocket wheels for the chains mounted in said frames, and adjusting bolts connected with said frames and supported from the frame of the machine.

11. In a machine for decorticating fibrous plants, in combination with a pair of pin cylinders mounted in separated endwise relation on a common shaft, and with feed mechanisms for the two cylinders, movable members positioned between the opposing ends of the two cylinders, and adapted to have cutting members applied thereto.

12. A machine for decorticating fibrous plants comprising a pair of rotary decorticating members mounted in endwise relation to move in unison, the first of said decorticating members having its upper operating surface located above the upper operating surface of the other member, means for feeding one end-portion of a plant over and into contact with the first decorticating member, and means for feeding the other end-portion over and into contact with the second or smaller decorticating member.

13. A machine for decorticating fibrous plants comprising a pair of pin cylinders mounted in endwise relation to move in unison, one of said cylinders being of less diameter than the other, means for feeding one end-portion of a plant over and into contact with the pins of one cylinder, and means for feeding the other end-portion over and into contact with the pins of the second cylinder.

14. In a machine for decorticating fibrous plants, in combination with a pair of pin cylinders mounted in endwise relation on a common shaft, and one of said cylinders being of less diameter than the other, means for feeding one end-portion of a plant over and into contact with the pins of the larger cylinder, and means for feeding the other end-portion over and into contact with the pins of the smaller cylinder.

15. In a machine for decorticating fibous plants, in combination with a decorticating member, feeding mechanism therefor comprising two endless carriers traveling in opposed parallel relation for a portion of their length, one of said carriers comprising two sprocket chains arranged side by side in such manner that the links of one chain break joint with those of the adjacent chain, and the other carrier being provided with resilient blocks adapted to travel in contact with the surfaces of said chains.

16. In a machine for decorticating fibrous plants, in combination with a rotary decorticating member, feeding mechanism arranged to grip the butt end of a plant and convey the plant over said member from end to end thereof, and a bar located adjacent to said member and extending longitudinally thereof entirely on one side of the feeding mechanism, and positioned to have its under side engaged by the free outer portion of the plant in its passage over the decorticating member, whereby to maintain said plant in contact with said decorticating member.

In testimony whereof, I have hereunto set my hand in presence of two subscribing witnesses.

WALTER JOHN HOLLIER.

Witnesses:
BRUCE S. ELLIOTT,
STELLA HILL.

Copies of this patent may be obtained for five cents each, by addressing the "Commissioner of Patents Washington, D. C."